No. 697,910. Patented Apr. 15, 1902.
A. W. WILSON.
FISHING GEAR.
(Application filed Dec. 13, 1901.)
(No Model.)
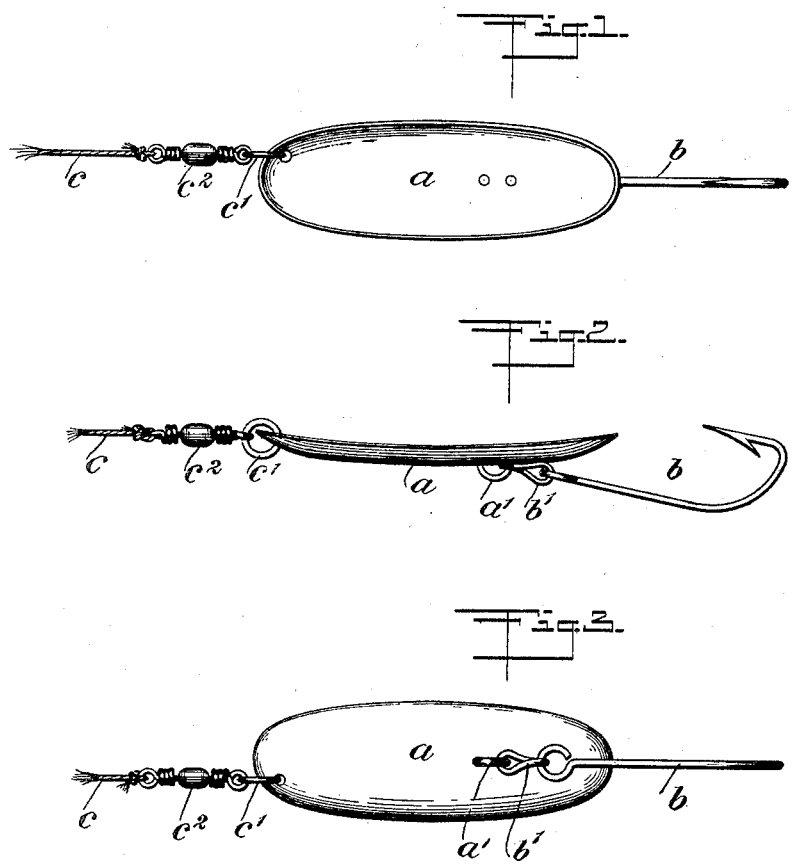

UNITED STATES PATENT OFFICE.

ALBERT WING WILSON, OF SAN FRANCISCO, CALIFORNIA.

FISHING-GEAR.

SPECIFICATION forming part of Letters Patent No. 697,910, dated April 15, 1902.

Application filed December 13, 1901. Serial No. 85,809. (No model.)

*To all whom it may concern:*

Be it known that I, ALBERT WING WILSON, a citizen of the United States, and a resident of San Francisco, in the county of San Francisco and State of California, have invented a new and Improved Fishing-Gear, of which the following is a full, clear, and exact description.

This invention relates to a trolling device serving to imitate live bait and bearing a hook by which the fish may be caught when the bait is taken. By practical observation I know that minnows and other small fish when being chased by larger fish swim erratically and "skitter" or swerve from side to side. This may be due to excitement of the minnow or to its being maimed or exhausted, and a trolling-spoon or artificial bait should be made to imitate these movements as much as possible in order to be effective.

My invention involves a trolling spoon or device of such form that the erratic "skittering" or swerving movement will be closely imitated.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is an elevation of the concave side of the spoon. Fig. 2 is an edge view thereof, and Fig. 3 is an elevation of the convex side of the spoon.

$a$ indicates the spoon proper, which is of an elongated ovate marginal contour and concavo-convex cross-sectional form.

$b$ indicates the hook, which is engaged by a link $b'$ with an eye or staple $a'$, fastened to the convex side of the spoon adjacent to the tail thereof.

$c$ indicates the fish-line, which is connected to a ring $c'$ by means of a swivel $c^2$. This ring $c'$ is joined to the front end of the spoon $a$. According to the construction shown in the drawings, which is the preferred construction, the ring $c'$ is located at one side of the longitudinal center of the spoon, and the staple or eye $a'$ is located in the longitudinal center of the spoon.

By attaching the hook to the convex side of the spoon near the tail I produce the erratic wabbling of the bait as it is trolled through the water. This wabbling may be increased or diminished at will by changing the location of the ring $c'$. When this ring is placed in the longitudinal center of the spoon, the wabbling or skittering movement of the spoon is reduced to a minimum, and the farther the ring is placed from the longitudinal center the greater the wabbling.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A fishing-gear, comprising a concavo-convex spoon, a hook connected to the convex side thereof within the line of its longitudinal center, and means for connecting the fish-line to the front end of the spoon, said means being situated at one side of the longitudinal center of the spoon.

2. A fishing-gear, comprising an elongated spoon, a fish-hook connected thereto adjacent to its tail, and means for attaching a line to the spoon, said means being located at one side of the longitudinal center of the spoon.

3. A fishing-gear, comprising a concavo-convex spoon, a hook having the end of its shank pivotally connected to the convex side of the spoon adjacent to its tail, but removed from the marginal edges of the spoon, and means for connecting the fish-line to the front end of the spoon.

4. A fishing-gear, comprising a concavo-convex spoon, a hook having the end of its shank pivotally connected to the convex side of the spoon adjacent to its tail, but removed from the marginal edges of the spoon, and means for connecting the fish-line to the front end of the spoon, said means being situated at one side of the longitudinal center of the spoon.

5. A fishing-gear, comprising a concavo-convex spoon, a hook connected thereto within the line of its longitudinal center, and means for connecting the fish-line to the front end of the spoon at one side of the longitudinal center of the spoon.

In testimony whereof I have signed my name to this specification in the presence of two subscribing witnesses.

ALBERT WING WILSON.

Witnesses:
OSMOND W. JAKSON,
GEO. M. MITCHELL.